[19] United States Patent
Straub et al.

(10) Patent No.: US 8,467,677 B2
(45) Date of Patent: Jun. 18, 2013

(54) METHOD FOR MONITORING A PASSIVE OPTICAL NETWORK USING MONITORING UNITS

(75) Inventors: Michael Straub, Maulbronn (DE); Harald Schmuck, Schwieberdingen (DE); Lothar Jentsch, Fredersdorf (DE); Jörg Hehmann, Weil der Stadt (DE)

(73) Assignee: Alcaltel Lucent, Paris (FR)

( * ) Notice: Subject to any disclaimer, the term of this patent is extended or adjusted under 35 U.S.C. 154(b) by 668 days.

(21) Appl. No.: 12/320,453

(22) Filed: Jan. 27, 2009

(65) Prior Publication Data

US 2009/0202238 A1 Aug. 13, 2009

(30) Foreign Application Priority Data

Jan. 30, 2008 (EP) .................................. 08001689

(51) Int. Cl.
 *H04B 10/08* (2006.01)
(52) U.S. Cl.
 USPC ............... 398/20; 398/32; 398/102; 398/161; 398/25
(58) Field of Classification Search
 USPC ............................................ 398/161, 102, 32
 See application file for complete search history.

(56) References Cited

U.S. PATENT DOCUMENTS

| | | | | |
|---|---|---|---|---|
| 5,504,606 | A * | 4/1996 | Frigo | 398/58 |
| 6,069,672 | A * | 5/2000 | Claassen | 348/734 |
| 6,778,550 | B1 * | 8/2004 | Blahut | 370/443 |
| 2002/0009070 | A1 * | 1/2002 | Lindsay et al. | 370/347 |
| 2002/0141017 | A1 * | 10/2002 | Chang et al. | 359/139 |
| 2006/0002706 | A1 * | 1/2006 | Lee et al. | 398/71 |
| 2006/0198634 | A1 * | 9/2006 | Ofalt et al. | 398/16 |
| 2007/0237523 | A1 * | 10/2007 | Miguel et al. | 398/71 |

FOREIGN PATENT DOCUMENTS

| | | |
|---|---|---|
| EP | 0 685 948 | 12/1995 |
| EP | 1 037 417 | 7/2006 |
| EP | 1 801 984 | 6/2007 |
| WO | WO 2006/023015 | 3/2006 |

* cited by examiner

*Primary Examiner* — Jessica Stultz
*Assistant Examiner* — Michael Carter
(74) *Attorney, Agent, or Firm* — Harness, Dickey & Pierce

(57) ABSTRACT

A method for monitoring a passive optical network (1), PON, having a tree-like structure with a main line (3) and at least two branches (6.1 to 6.3), comprising: transmitting a wake-up signal (10) from the main line (3) to at least two monitoring units (DPM1 to DPM3) arranged in the at least two branches (6.1 to 6.3), in each of the monitoring units (DPM1 to DPM3), detecting the wake-up signal (10) and transmitting a response signal (A, B, C) back to the main line (3), each of the monitoring units (DPM1 to DPM3) generating a pre-defined time delay ($\Delta t_A$ to $\Delta t_C$) between the detection of the wake-up signal (10) and the start of the transmission of the response signal (A, B, C), and receiving the response signals (A, B, C) at the main line (3), the receiving times (R1 to R3) of the response signals (A, B, C) being different from each other, the difference between the receiving times (R1 to R3) being adjusted by the pre-defined time delays ($\Delta t_A$ to $\Delta t_C$) of the monitoring units (DPM1 to DPM3).

13 Claims, 2 Drawing Sheets

METHOD FOR MONITORING A PASSIVE OPTICAL NETWORK USING MONITORING UNITS

BACKGROUND OF THE INVENTION

The invention is based on a priority application EP08001689.2 which is hereby incorporated by reference.

The invention relates to a method for monitoring a passive optical network, PON, having a tree-like structure with a main line and at least two branches, to a monitoring unit connectable to a branch of a PON, and to a PON having a tree-like structure with a main line and at least two branches comprising monitoring units.

In order to improve the quality of service of optical networks, in particular passive optical networks (PONs) with a tree-like structure, continuous monitoring techniques detecting and localizing faults are of special interest, as they are expected to provide substantial cost savings to telecommunications companies operating these networks.

However, due to the large distances which are covered by the fiber links of a PON, a network operator usually only has access to the network from the main line, in particular from an optical line termination, OLT, which is located at a head end of the PON. For checking the functionality of the branches of the PON from the main line, it is known to dispose monitoring units in these branches which are usually arranged close to the location of the end users.

The downstream communication between the OLT and the monitoring units may be performed by the transmission of binary information including an identifier for a particular monitoring unit which may then execute a predefined function. In this respect, EP 1 037 417 B1 discloses a method for performing central control of an in-line element e.g. an optical amplifier or an optical switch in a tree-like network, wherein the OLT adds extra bits in predefined grants sent downstream to the in-line element. These extra bits comprise an identification of the in-line element and contain a locally predefined function for execution by the selected in-line element.

For performing downstream communication in the way described above, expensive equipment is required in the monitoring units, as the binary down-stream signal has to be processed in each of the monitoring units in order to determine which of the monitoring units is addressed by the OLT. For this purpose, a processing unit which is capable of processing binary data is required which has to Listen permanently to the downstream traffic, leading to a considerable energy consumption of the monitoring units.

OBJECT OF THE INVENTION

It is the object of the invention to provide: a method, a monitoring unit, and a PON as described in the introduction, all of which allow to perform monitoring of a PON in a reliable and cost-effective way.

SUMMARY OF THE INVENTION

This object is achieved by a method as described in the introduction, comprising: transmitting a wake-up signal from the main line to at least two monitoring units arranged in the at least two branches, in each of the monitoring units, detecting the wake-up signal and transmitting a response signal back to the main line, each of the monitoring units generating a pre-defined time delay between the detection of the wake-up signal and the start of the transmission of the response signal, and receiving the response signals at the main line, the receiving times of the response signals being different from each other, the difference between the receiving times being adjusted by the pre-defined time delays of the monitoring units.

For performing monitoring of the PON, the OLT generates only one wake-up signal which is the same for all of the monitoring units, the wake-up signal having preferably an easily detectable form, such that a cost-effective detector can be used in the monitoring units, consuming only a small amount of energy. The detection of the wake-up signal is then used as a trigger for the monitoring units to send their response signals, each with an individual delay time, such that the response signals of the different monitoring units can be distinguished in the main line by a suitable detection unit, e.g. an embedded receiver being implemented in the OLT.

The time delays of the monitoring units may be adjusted during the installation of the passive optical network, ensuring that the response signals do not arrive concurrently during their detection in the main line. For this purpose, the different signal propagation delays of the response signals due to the different lengths of the fiber lines between the monitoring units and the main line have to be taken into consideration. In some cases, the time delays of two or more of the monitoring units may be chosen to be equal if the different signal propagation delays lead to a sufficient separation of the receiving times in the OLT. However, typically this is not the case, such that the time delays of the monitoring units are chosen to be different from each other.

In a preferred variant, the method further comprises: adjusting the pre-defined time delays for allocating each of the response signals to one of a plurality of detection intervals, the detection intervals alternating with gaps in which no response signals are received. In such a way, the response signals are only received during well-defined time slots of constant length, alternating with gaps having also a constant length, such that listening to the upstream signals is necessary only during the detection intervals, it being possible to use the gaps e.g. to perform OTDR measurements. Depending on the number of monitoring units and of the type of detection used, only one or a plurality of the response signals may be allocated to the same detection interval.

In a improvement of this variant, evaluation of the response signals is performed during the gaps. In particular when response signals which comprise information about the individual monitoring units are transmitted, this information may be extracted from the response signals during the gaps by performing a data readout. In case that the detection is performed in the optical line termination, transmission of the information extracted from the response signals to a network management unit may also be performed during the gaps.

In a highly preferred variant the response signals comprise information about the monitoring units, and for determining if a particular monitoring unit is available only the envelope of its response signal is evaluated. By determining if an envelope of a particular response signal has been received, a quick check can be performed if the monitoring unit is still available. It is understood that alternatively, the information contained in the response signals may also be evaluated directly, i.e. without first evaluating the envelope of the response signals.

Preferably, the wake-up signal is chosen to be a periodical signal, in particular a sine wave signal. As a wake-up signal, typically a signal is chosen which can be easily detected, such as a sine wave with a constant frequency of e.g. about 1 kHz.

A further aspect of the invention is implemented in a monitoring unit connectable to a branch of a passive optical network, PON, the monitoring unit comprising: a detector for detecting a wake-up signal transmitted to the monitoring unit from a main line of the PON, a transmitter for generating a response signal to be transmitted from the monitoring unit back to the main line, and a delay generator for generating a pre-defined delay between the detection of the wake-up signal and the start of the transmission of the response signal. The delay generator may be an adjustable or fixed delay line, the delay being usually performed in the electrical domain, as the wake-up signal is typically o/e-converted for its detection.

In a preferred embodiment, the monitoring unit has a mode switching unit for switching between a first operation mode with low power consumption and a second operation mode with higher power consumption, the switching from the first operation mode to the second operation mode being triggered by the detection of the wake-up signal. In the first operation mode, a response signal generator is in a standby (deactivated) mode with low or no energy consumption which does not allow response signals to be transmitted in upstream. The detection of the wake-up signal can be used to trigger the activation of the upstream signal generator. A preparation time required for the activation of the signal generator may be taken into account when adjusting the variable time delay of the monitoring units, e.g. by providing an additional, constant time delay in each of the monitoring units which is sufficient for activating the upstream signal generator. It is understood that part of the downstream signal which is tapped by the monitoring unit may be used to charge a rechargeable energy storage, in particular a capacitor, in the first operation mode, the capacitor being partially or almost entirely discharged during the transmission of the response signal in the second operation mode.

A further aspect of the invention is implemented in a passive optical network, PON, having a tree-like structure with a main line and at least two branches comprising monitoring units of the type described above, the PON further comprising: an optical line termination, OLT, connected to a head end of the main tine for transmitting the wake-up signal from the main line to the at least two monitoring units and for receiving the response signals from the at least two monitoring units, wherein the OLT receives the response signals at receiving times which are different from each other, the difference between the receiving times being adjusted by the pre-defined delays of the delay generators of the monitoring units. In such a PON, detection of faults, e.g. of fiber breaks, in the branches of the PON can be performed by checking the availability of the monitoring units in the respective branches. Additional information about the monitoring units, e.g. about their temperature, may be contained in the response signals, which may be encoded in the response signals by using a suitable modulation format, e.g. amplitude modulation or time shift keying, or, in case that the response signals are binary signals, by using specific bit patterns for transferring the information.

In a preferred embodiment, each of the response signals is allocated to one of a plurality of detection intervals by adjusting the pre-defined delays, the detection intervals alternating with gaps in which no response signals are received by the OLT. The adjustment may be performed during the set-up of the PON or when an update of the PON is required. In any case, the time delays should be chosen such that further branches with monitoring units may be added to the PON during an update without having to modify the time delays of the monitoring units for which the pre-defined delay has already been set, which can be done by reserving unused time slots in the detection intervals or simply by adding further detection intervals during a network update. Advantageously, the passive optical network is an operator network and the at least two monitoring units are arranged in the operator network adjacent to a demarcation point to a user network. By placing the monitoring units close to a demarcation point, i.e. close to the border Line between the operator network and a user network, the monitoring units can be used to distinguish between network failures within the operator network and network failures within the user network.

Further features and advantages are stated in the following description of exemplary embodiments, with reference to the figures of the drawing, which shows significant details, and are defined by the claims. The individual features can be implemented individually by themselves, or several of them can be implemented in any desired combination.

BRIEF DESCRIPTION OF THE DRAWINGS

Exemplary embodiments are shown in the diagrammatic drawing and are explained in the description below. The following are shown.

DETAILED DESCRIPTION OF PREFERRED EMBODIMENTS

Figure 1:
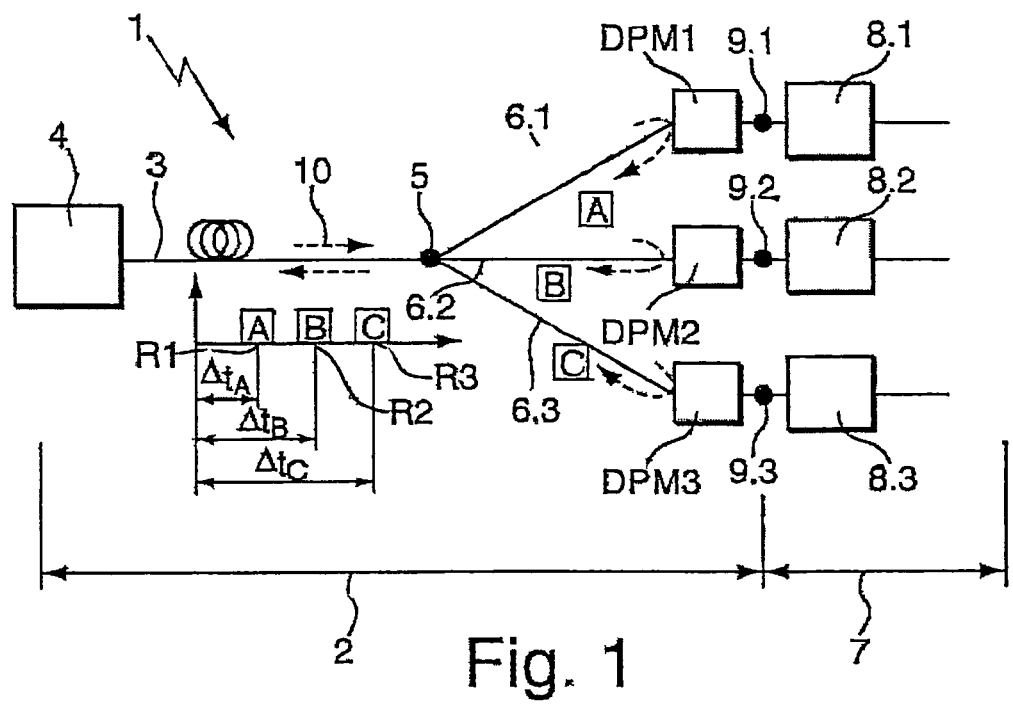
FIG. 1 shows a schematic diagram of an embodiment of a passive optical network according to the invention.

FIG. 1 shows a passive optical network I which comprises a tree-like operator network 2 as a first section. The operator network 2 has a main fiber line 3 being located between an Optical Line Termination (OLT) 4 and a 1×N passive optical distribution network (splitter) 5 connecting the main line 3 with a number N of branches, three of which (6.1 to 6.3) are shown in FIG. 1. The branches 6.1 to 6.3 of the operator network 2 are continued in a user network 7 which constitutes a second section of the optical network 1 and which comprises Optical Network Terminations (ONTs) 8.1 to 8.3, one for each of the branches 6.1 to 6.3. A so-called demarcation point 9.1 to 9.3 marks the limit between the operator network 2 and the user network 7 in each of the branches 6.1 to 6.3. In the operator network 2, monitoring units DPM1 to DPM3 are arranged adjacent to each of the demarcation points 9.1 to 9.3, which, due to their position in the optical network 1 are also referred to as a demarcation point monitors (DPMs) in the following. The person skilled in the art will appreciate that the PON 1 of in FIG. 1 only shows the basic structure of PONs and that real PONs are usually much more complex.

As the operator is responsible for faults occurring in the operator network 2, e.g. due to fiber breaks, the operator has to monitor the network 1 continuously to spot possible defects. Due to the Large distances which are covered by the fiber links in the network 1, the operator generally has only access to the network 1 via the OLT 4, also referred to as central office, and has to check the correct operability of the network 1 from this site all the way down to the demarcation points 9.1 to 9.3.

For monitoring the network 1, the OLT 4 generates a wake-up signal 10 which is transmitted downstream through the branches 6.1 to 6.3 of the operator network 2 to the monitoring units DPM1 to DPM3. The wake-up signal 10 is an easily detectable signal, for example a sine wave signal with a frequency of 10 kHz which is not modulated such that the wake-up signal 10 cannot address a particular one of the monitoring units DPM1 to DPM3. The wake-up signal 10 is only transmitted during a short time interval, the time duration of which is chosen to be sufficiently long for allowing detection of the wake-up signal 10 in the monitoring units DPM1 to DPM3, which will be described in the following with reference to FIG. 2 showing the first one (DPM1) of the monitoring units DPM1 to DPM3.

The first monitoring unit DPM1 has a tap coupler 11 which branches part (about 5% of the total intensity) of the downstream signal from the branch 6.1 to an optical receiver 12 comprising a photodiode which is used as an o/e-conversion element. A detector 13 implemented in a microprocessor (not shown) is provided in the first monitoring unit DPM1 for detecting the sine wave wake-up signal 10 in the downstream transmission from the OLT 4 to the ONTs 8.1 to 8.3. After the detector 13, a delay generator 14 is arranged in the signal path of the first monitoring unit DPM1, the delay generator 14 being implemented e.g. as a counter of the microprocessor for generating a pre-determined time delay $\Delta t_A$ before the generation of a response signal A in a response signal generator 18 of the monitoring unit DPM1. A transmitter 15 is used to perform e/o-conversion of the delayed response signal A which is then transmitted in upstream via a further tap coupler 17, the upstream transmission wavelength of the response signal A corresponding to the downstream transmission wavelength of the wake-up signal 10.

The response signal generator 18 may generate a simple sine wave signal with constant frequency, or information about the monitoring unit DPM1, e.g. about its temperature, may be added to the response signal A, e.g. using amplitude modulation. It is understood that other modulation formats such as frequency-shift keying may be used as well for the addition of information to the response signal. Alternatively, it is possible to generate a binary signal, e.g. at 100 kHz, which may also include a header sequence, in the response signal generator 18. In any case, after the detection of the wake-up signal 10, the transmission of the response signal A is delayed by the pre-defined time delay $\Delta t_A$, the absolute value of the time delay $\Delta t_A$ being stored e.g. in a memory of the microprocessor of the monitoring unit DPM1.

Figure 2:
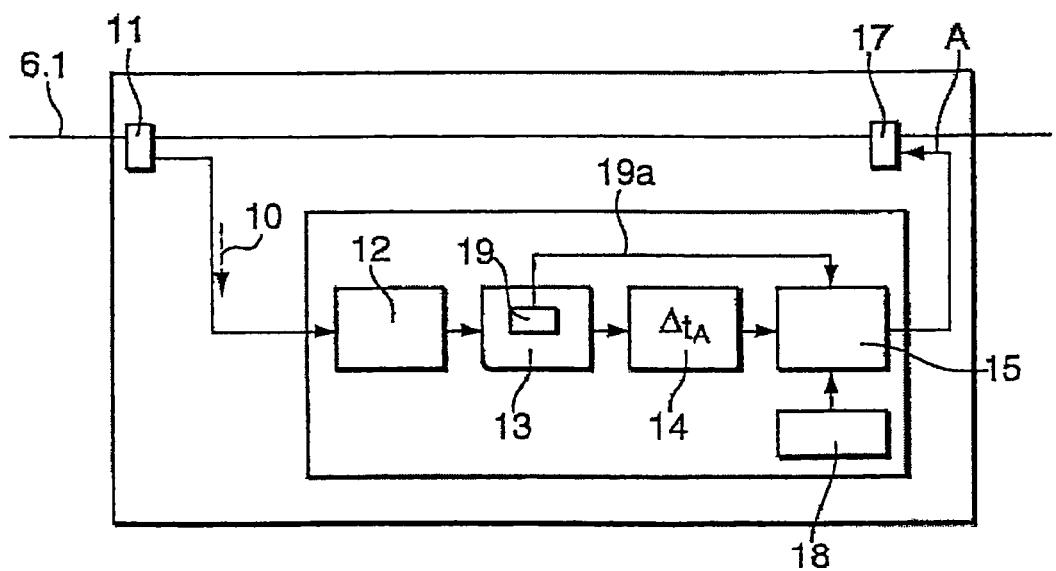
FIG. 2 shows an embodiment of a monitoring unit according to the invention, FIG. 3a,b show detection intervals alternating with gaps in case that (a) one response signal is attributed to each detection interval and (b) a plurality of response signals are attributed to each detection interval.

In the embodiment of the monitoring unit DPM1 shown in FIG. 2, a switching unit 19 is provided in the detector 13 for switching the monitoring unit DPM1 from a first operation mode with low power consumption to a second operation mode with higher power consumption. For this purpose, the switching unit 19 sends a trigger signal 19a to the transmitter 15 when the wake-up signal 10 is detected, which causes the transmitter 15 to switch from a standby mode to a mode which allows the generation and transmission of the response signal A. The time delay of the delay generator 14 is chosen sufficiently long for the transmitter 15 to have time to switch from the first to the second operation mode.

The monitoring unit DPM1 may be powered by a battery (not shown) which is only slowly discharged in the first operation mode having low power consumption. Alternatively or in addition, the monitoring unit DPM1 may be powered by an external power source or by using the power of the o/e-converted part of the downstream signals during time intervals in which no wake-up signal 10 is detected in the detector 13. In the latter case, a rechargeable energy storage such as a capacitor may be provided in the monitoring unit DPM1.

The monitoring unit DPM1 transmits a response signal A with a pre-defined time delay $\Delta t_A$ with respect to the detection of the wake-up signal 10, the time delay $\Delta t_A$ being essentially determined by the delay generator 13. As each of the monitoring units DPM1 to DPM3 of FIG. 1 has an individual time delay $\Delta t_A$, $\Delta t_B$, $\Delta t_C$, by adjusting these pre-defined time delays $\Delta t_A$, $\Delta t_B$, $\Delta t_C$ in an appropriate way, the superposition of their response signals A, B, C on the main line 3 generates a superimposed signal in which the three response signals A, B, C are delayed with respect to each other, such that they may be received at three different receiving times R1 to R3.

It is understood that the time delay of the response signals A, B, C on the main line 3 is not only due to the time delays $\Delta t_A$, $\Delta t_B$, $\Delta t_C$ of the monitoring units DPM1 to DPM3, but also due to the different signal propagation delays of the response signals A, B, C which are caused by the different lengths of the branches 6.1 to 6.3 connecting the monitoring units DPM1 to DPM3 to the main line 3. Consequently, the signal propagation delays have to be taken into account for generating a desired delay of the response signals A, B, C on the main line 3, which may be done by measurements of the signal propagation times within the fibers. In the example of FIG. 1, the propagation delays have been neglected, such that the time delays $\Delta t_A$, $\Delta t_B$, $\Delta t_C$ on the main line 3 coincide with the time delays $\Delta t_A$, $\Delta t_B$, $\Delta t_C$ of the monitoring units DPM1 to DPM3. Due to the characteristic delay of the response signals A, B, C, the OLT 4 can perform a simple mapping for checking the availability of the monitoring units DPM1 to DPM3.

In case that no data is contained in the response signals A, B, C, a simple envelope detection is sufficient for checking the availability of the corresponding monitoring units DPM1 to DPM3. Such an envelope detection may be performed also in case that data is encoded in the response signals A, B, C if a fast detection of the availability of the monitoring units DPM1 to DPM3 is desired.

Figure 3A:
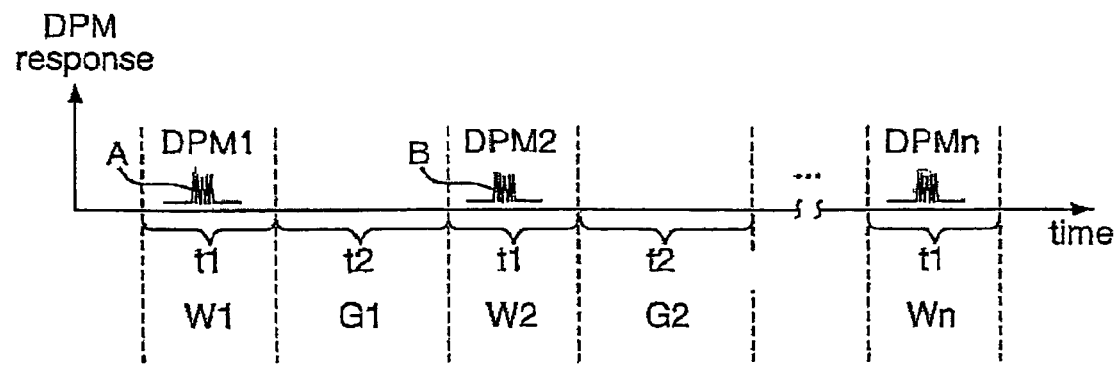

By adjusting the time delays of a plurality of monitoring units DPM1 to DPMn in an appropriate way, it is also possible to allocate each of the response signals A, B, . . . of the monitoring units DPM1 to DPMn to one of a plurality of detection intervals W1 to Wn represented in FIG. 3a, the detection intervals W1 to Wn alternating with gaps G1, G2, . . . during which no response signals are received. During the gaps G1, G2, . . . an evaluation of the data contained in the response signals A, B, . . . may be performed when these are received in the OLT 4, or the OLT 4 may use the gaps G1, G2, . . . to transfer the extracted information to a network control unit (not shown), it also being possible for the OLT 4 to perform ODTR measurements during the gaps G1, G2, . . . . For this purpose, the time duration t, of the detection intervals W1 to Wn may be chosen much smaller than the time duration $t_2$ of the gaps G1, G2, . . . . In a typical example, $t_1$ may be set to a value of 10 msec, whereas $t_2$ may be set to 2 sec.

Figure 3B:
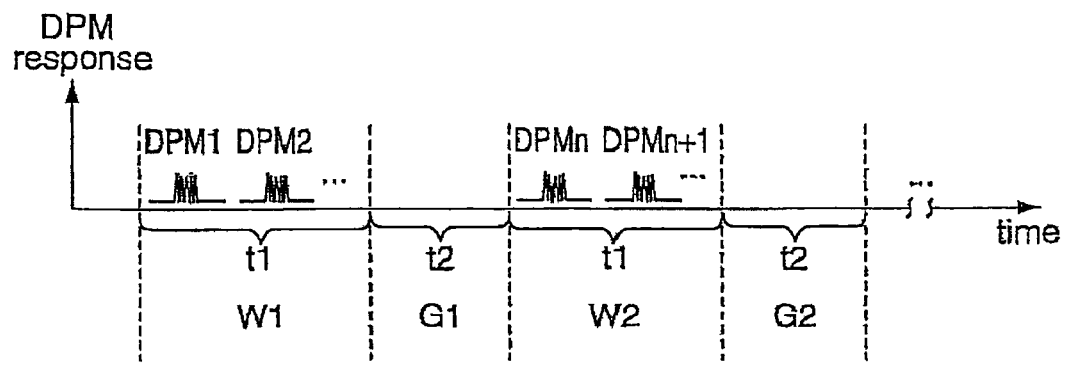

In the example shown in FIG. 3a, each of the response signals is allocated to only one detection interval W1 to Wn. However, an allocation may also be chosen in which response signals from a plurality of monitoring units DPM1, DPM2, . . . are allocated to a first detection interval W1, whereas response signals from a second plurality of monitoring units DPMn, DPMn+1, . . . are allocated to a second detection interval W2, as shown in FIG. 3b. In such a way, the time duration $t_1$ of the detection intervals W1, W2, . . . increases, the time duration $t_2$ of the gaps G1, G2 may be decreased in this case.

In summary, in the way described above, a simple and cost-effective scheme for monitoring of passive optical networks is provided. In particular, power consumption of the monitoring units can be reduced by provision of a standby mode. The monitoring units can be connected easily within the network and the demarcation point can be moved with the network extension. Moreover, the solution is transparent, as the data channels are not influenced, provided that the upstream transmission wavelengths of the data channels are chosen to be different from the upstream transmission wavelength of the monitoring units.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

The invention claimed is:

1. A method for monitoring a passive optical network, PON, having a tree-like structure with a main Line and at least two branches, comprising:
   transmitting a wake-up signal, during a period of time, from the main line to at least two monitoring units arranged in the at least two branches, the wake-up signal not undergoing a frequency modulation and not being adapted to address a particular one of the monitoring units, the period of time being a single time slot having a duration chosen such that the wake-up signal is detected at the at least two monitoring units,
   in each of the monitoring units, detecting the wake-up signal and transmitting a response signal back to the main line, each of the monitoring units generating a pre-defined time delay between the detection of the wake-up signal and the start of the transmission of the response signal, and
   receiving the response signals at the main line, the receiving times of the response signals being different from each other, the difference between the receiving times being adjusted by the pre-defined time delays of the monitoring units.

2. The method according to claim 1, further comprising:
   adjusting the pre-defined time delays for allocating each of the response signals to one of a plurality of detection intervals, the detection intervals alternating with gaps in which no response signals are received.

3. The method according to claim 2, wherein evaluation of the response signals is performed during the gaps.

4. The method according to claim 1, wherein the response signals comprise information about the monitoring units and, for determining if a particular monitoring unit is available, only the envelope of its response signal is evaluated.

5. The method according to claim 1, wherein the wake-up signal is chosen to be a periodical signal, preferably a sine wave signal.

6. The method according to claim 1, wherein the at least two monitoring units are configured to be connected to optical network terminals that are separate distinct units from the at least monitoring units.

7. A plurality of monitoring units, each monitoring unit connectable to a branch of a passive optical network, PON, and comprising:
   a detector configured to detect a wake-up signal transmitted to the monitoring unit during a period of time from a main line of the PON, the wake-up signal not undergoing a frequency modulation and not being adapted to address the monitoring unit and the period of time being a single time slot having a duration chosen such that the wake-up signal is detected at the plurality of monitoring units,
   a transmitter for generating a response signal to be transmitted from the monitoring unit back to the main line, and
   a delay generator for generating a pre-defined delay between the detection of the wake-up signal and the start of the transmission of the response signal.

8. The plurality of monitoring units according to claim 7, wherein each monitoring unit further comprises:
   a mode switching unit for switching between a first operation mode with low power consumption and a second operation mode with higher power consumption, the switching from the first operation mode to the second operation mode being triggered by the detection of the wake-up signal.

9. A passive optical network, PON, having a tree-like structure with a main line and at least two branches comprising monitoring units according to claim 7, the PON further comprising:
   an optical Line termination, OLT, connected to a head end of the main Line for transmitting the wake-up signal from the main line to the plurality of monitoring units and for receiving the response signals from the plurality of monitoring units, wherein
      the OLT receives the response signals at receiving times which are different from each other, the difference between the receiving times being adjusted by the pre-defined delays of the delay generators of the monitoring units.

10. The passive optical network according to claim 9, wherein each of the response signals is allocated to one of a plurality of detection intervals by adjusting the pre-defined delays, the detection intervals alternating with gaps in which no response signals are received by the OLT.

11. The passive optical network according to claim 9, wherein the passive optical network is an operator network and the plurality of monitoring units are arranged in the operator network adjacent to a demarcation point to a user network.

12. The passive optical network according to claim 9, further comprising:
   optical network terminals connected to the plurality of monitoring units that are separate distinct units from the plurality of monitoring units.

13. The plurality of monitoring units according to claim 7, wherein the plurality of monitoring units are configured to be connected to optical network terminals that are separate distinct units from the plurality of monitoring units.

* * * * *